United States Patent

[11] 3,589,654

| | | | |
|---|---|---|---|
| [72] | Inventor | Stephen L. Snyder 331 Cherry Hill Blvd., Cherry Hill, N.J. 08034 | |
| [21] | Appl. No. | 797,020 | |
| [22] | Filed | Feb. 6, 1969 | |
| [45] | Patented | June 29, 1971 | |

[54] GLIDE CONTROL SYSTEM FOR CONTROLLED DESCENT PARACHUTE
12 Claims, 3 Drawing Figs.

[52] U.S. Cl. .................................................. 244/152
[51] Int. Cl. ............................................. B64d 17/14
[50] Field of Search .................................... 244/138, 142, 145, 152, Dig. 1

[56] References Cited
UNITED STATES PATENTS

| | | | |
|---|---|---|---|
| 3,396,921 | 8/1968 | Rogallo | 244/138 (X) |
| 3,104,857 | 9/1963 | Knacke et al. | 244/145 |
| 3,223,361 | 12/1965 | Girard | 244/75 |
| 3,361,389 | 1/1968 | De Foras | 244/49 |
| 3,412,963 | 11/1968 | Struble, Jr. | 244/152 (X) |
| 3,433,441 | 3/1969 | Cummings | 244/152 (X) |

FOREIGN PATENTS

| | | | |
|---|---|---|---|
| 1,075,314 | 7/1967 | Great Britain | 244/138 |

Primary Examiner—Milton Buchler
Assistant Examiner—Carl A. Rutledge
Attorneys—Clarence A. O'Brien and Harvey B. Jacobson ABSTRACT: A glide-type of parachute canopy is provided with an airflow deflecting flap having an edge vertically displaceable intermediate the nose and trailing edge of the canopy to compensate for shift of the center of pressure tending to produce divergent stall when forward glide speed is being reduced by variation in the inflated shape of the canopy.

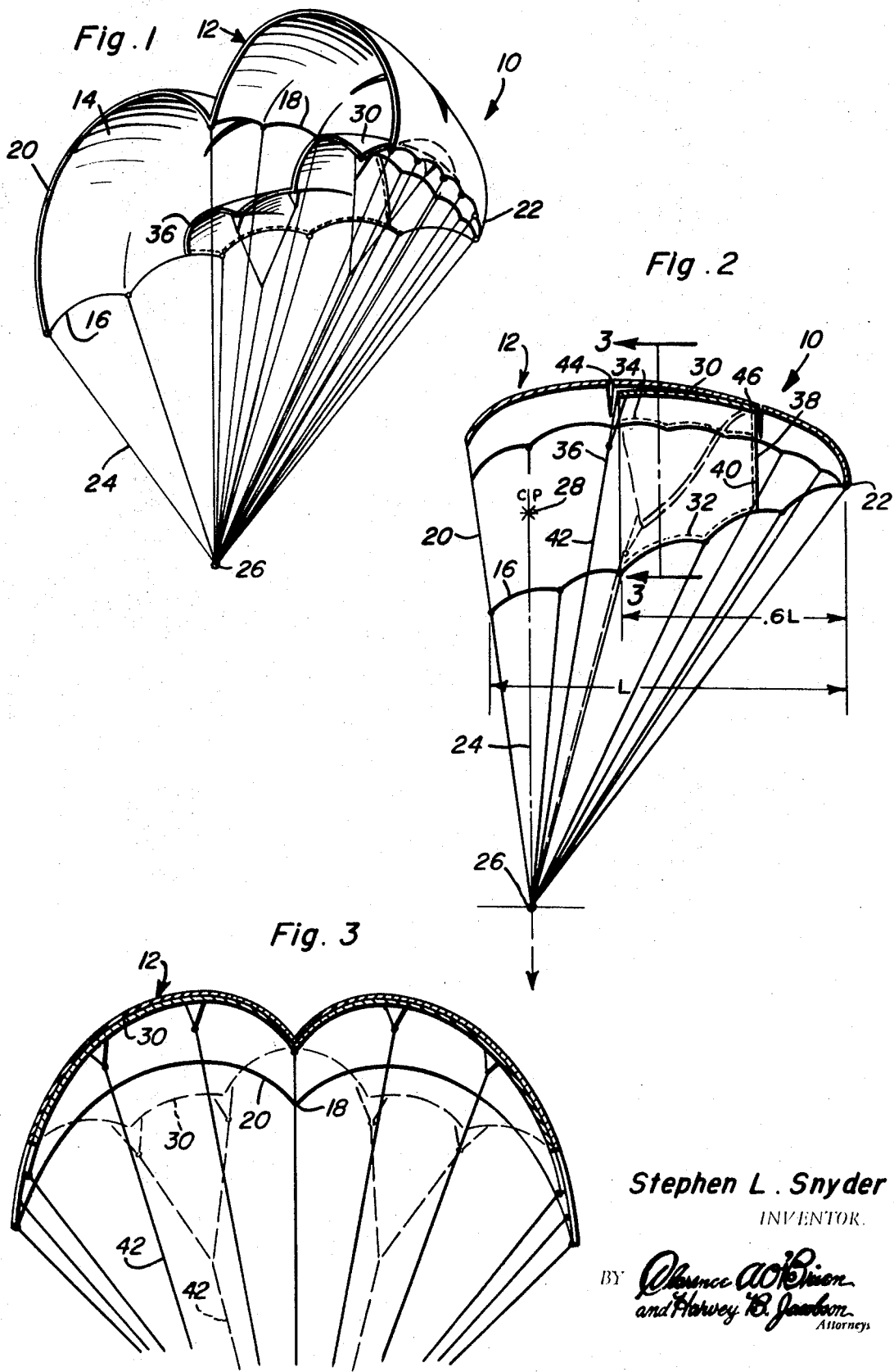
Stephen L. Snyder
INVENTOR

GLIDE CONTROL SYSTEM FOR CONTROLLED DESCENT PARACHUTE

This invention relates to controlled descent types of parachutes and more particularly to a glide control compensating device for such parachutes.

Controlled descent types of parachutes having an inflated canopy shape designed to produce forward movement during descent, are well known. In this type of parachute, the inflated canopy shape may be varied through the load lines in order to regulate the forward glide speed during descent, this capability of the parachute being of significant advantage. However, a serious problem arises when attempting to reduce the forward glide speed of such parachutes which creates an extremely dangerous situation particularly at relatively low altitudes. During forward glide, any attempt to reduce the forward glide speed may produce a shift and change in the forces acting on the inflated canopy that results in an unstable condition because of an increasing pitching moment causing the parachute canopy to suddenly stall to one side of the load. The sudden removal of the canopy lift force from the descending load resulting from the foregoing situation, is extremely dangerous where the elevation of the load is insufficient to permit complete recovery and reinflation of the parachute canopy within sufficient time to decelerate the falling load.

In accordance with the present invention, the foregoing condition which sometimes occurs when attempting to reduce forward glide speed, referred to as divergent stall, is precluded by an airflow deflecting means within the canopy capable of being adjusted through control lines extending to the load. The airflow deflecting means is thus adjusted to a position overcoming the tendency for the center of pressure to shift in such a direction as to cause instability. In one form of the invention, the airflow deflecting means is in the form of a flexible panel the side edges of which are sewn to the canopy along its side edges and to the keel line so as to ordinarily assume the same inflated transverse shape of the canopy. A rear edge of the air deflecting panel is vertically displaceable by an adjustable amount in order to control the amount of air deflected during forward glide movement of the canopy. It will of course be appreciated that air deflecting means other than a flexible panel may be utilized for accomplishing the same or similar purposes and various adjusting controls could also be utilized.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a typical parachute within which the present invention is installed.

FIG. 2 is a side sectional view through the parachute illustrated in FIG. 1.

FIG. 3 is an enlarged partial sectional view taken substantially through a plane indicated by section line 3—3 in FIG. 2.

Referring now to the drawings in detail, FIG. 1 illustrates a parachute generally denoted by reference numeral 10 which is exemplary of the type of parachute with which the present invention is associated. This type of parachute includes for example a flexible canopy generally referred to by reference numeral 12 having an inflated shape which cross-sectionally forms a pair of lobes 14 between laterally spaced side edges 16 and a keel line 18 which extend forwardly from a rear trailing edge 20 toward a tapered nose portion 22. The inflated shape of the canopy 12 is controlled by the relative lengths of the load lines 24 interconnecting the load 26 with the side edges 16 and the keel line 18. It will of course be appreciated, that the present invention is also applicable to other canopy shapes having a different number of lobes for example or a continuous surface type.

One of the well-known attributes of the described type of parachute, is its forward glide movement during descent. Thus, in order to control descent, the forward glide speed of the parachute may be varied by varying the cross-sectional shape of the inflated canopy. As a result of downward and forward glide movement of the parachute, the airflow through the parachute canopy and the deflection of air therefrom exerts a resultant lift force on the canopy extending through a theoretical center of pressure 28 as diagrammatically illustrated in FIG. 2. Ideally, the spacing of the center of pressure 28 from the load 26 and the angle of the resultant lift force is such as to maintain the canopy in a vertically stable position relative to the load 26 during descent and forward glide movement. However, when the cross-sectional shape of the inflated canopy is varied in an attempt to reduce the forward glide speed, a change in the angle of attack and a shift in the center of pressure 28 occurs which disturbs the stable condition characterized by an increasing positive pitching moment on the canopy relative to the load 26 causing the canopy to exhibit dangerous stall characteristics. This condition is referred to as divergent stall and results in a sudden although temporary removal of lift force from the load, until the load free falls to a position below the canopy causing it to reinflate and recover its lift capability. It will be appreciated that such a divergent stall condition is extremely dangerous at low altitudes in view of the acceleration of the load and the time it takes for the parachute to recover and decelerate the load before it reaches ground.

In accordance with one embodiment of the invention as illustrated in the drawings, each lobe 14 of the canopy enclosing an air flow channel is provided with an airflow deflecting flap panel 30 extending completely across the cross-sectional air flow area of the channel at its forward leading edge 38. The panel 30 extends transversely along a portion of the canopy lobe 14 between a side edge 16 and the keel line 18 with one of the side edges of the panel being sewn to the canopy side edge 16 as shown by the stitching 32, the other side edge of the panel being sewn to the keel line 18 as shown by stitching 34. The air deflecting panel is provided with a rear, vertically displaceable control edge 36 which may be disposed substantially parallel to the trailing edge 20 of the canopy and forwardly spaced therefrom. The panel 30 may extend forwardly from its rear control edge 36 by any desired amount to meet different requirements and even as far as the nose portion 22. By way of example only, the panel 30 as more clearly seen in FIG. 2 is shown to terminate at the forward leading edge 38 which is sewn to the canopy as indicated by stitching 40.

The dimension of the flexible air deflecting panel 30 is such that it normally assumes substantially the inflated cross-sectional shape of the canopy itself as shown in FIGS. 2 and 3 by solid line. The rear edge 36 is however vertically displaced downwardly by means of the control lines 42 connected thereto at spaced locations as shown by solid line in FIGS. 2 and 3, to an adjusted position as shown by dotted lines. The control lines extend to the load from which the rear control edge 36 of the panel is displaced to an adjusted position regulating internal aerodynamic conditions so as to obviate any possible divergent stall condition developing during regulated forward glide of the parachute. Also, the rear edges 36 of the panels associated with the two lobes of the canopy may be displaced by differential amounts to give the parachute a turning capability.

Initial downward displacement of the rear control edge 36 of the panel 30, may temporarily increase lift but as the deflection angle and drag increases, a change in the attack angle of airflow through the canopy occurs to prevent any undesirable change in center of pressure location that gives rise to the divergent stall condition aforementioned, the downwardly deflected flaps 30 act to reestablish the stability of the center of pressure position. In the embodiment of the invention illustrated, it has been found that an optimum location for the rear control edge 36 is a distance from the nose portion 22 which is approximately equal to 60 percent of the keel length (L) as depicted in FIG. 2. Further, as an auxiliary feature, the canopy may be provided with vent slots 44 and 46 located rearwardly and forwardly of but now over the panel 30 as more clearly seen in FIG. 2. Thus, the control panel 30 underlies a relatively imperforate portion of the canopy and does not therefore disturb aerodynamic flow over the top surface of the canopy. Only airflow under the canopy is affected. One of the edges of each vent slot is capable of being downwardly displaced in order to vary the amount of excess air conducted upwardly and forwardly of the canopy during control of glide descent. As also shown in FIG. 2, there is an initial spacing of the rear control edge 36 from the canopy in order to facilitate its downward displacement to an adjusted position, the initial spacing however being insufficient to affect forward glide. Thus, whenever the cross-sectional shape of the inflated canopy is varied through the load lines in order to reduce forward glide speed, the rear control edge 36 of the air deflecting panel 30 is correspondingly displaced downwardly to an adjusted position providing drag and also preventing the divergent stall condition from occurring.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In combination with a parachute having a glide-type canopy with a trailing edge, glide control means for increasing drag and preventing divergent stall during forward glide of the canopy when inflated comprising airflow deflecting means mounted on the canopy underlying a relatively imperforate portion thereof forwardly of the trailing edge for downwardly deflecting airflow through the inflated canopy, and control lines extending from the airflow deflecting means to the load for varying the amount of air deflected during forward movement at a regulated glide speed.

2. The combination of claim 1 wherein the canopy is provided with air vents forwardly and rearwardly of the airflow deflecting means through which excess air is conducted.

3. In combination with a parachute having a glide-type canopy from which a load is suspended for controlled descent, glide control means for increasing drag and preventing divergent stall during forward glide of the inflated canopy comprising airflow deflecting means mounted on the canopy underlying a relatively imperforate portion thereof for downwardly deflecting airflow relative to the inflated canopy, and control lines extending from the airflow deflecting means to the load for varying the amount of air deflected during forward movement at a regulated glide speed, said canopy having a forward nose portion and a trailing edge spaced therefrom by a predetermined distance along a keel line, said trailing edge cross-sectionally defining at least two lobes dimensionally varied transversely of the keel line to regulate said forward glide speed, said airflow deflecting means being spaced from the trailing edge within each of the lobes of the canopy.

4. The combination of claim 3, wherein said airflow deflecting means includes a flexible panel secured to the canopy within each of the lobes along a side edge and to the keel line, said panels having displaceable rear edges to which the control lines are connected for differential displacement to effect turning of the canopy.

5. The combination of claim 4, wherein said panel further includes a forward edge secured to the canopy.

6. The combination of claim 5, wherein said rear edge of the panel is spaced from the nose portion of the canopy approximately six-tenths of the predetermined distance along the keel line.

7. The combination of claim 6, wherein the canopy is provided with air vents forwardly and rearwardly of the airflow deflecting means through which excess air is conducted.

8. The combination of claim 4, wherein said rear edge of the panel is spaced from the nose portion of the canopy approximately six-tenths of the predetermined distance along the keel line.

9. In combination with a parachute having a glide-type canopy enclosing an airflow channel when inflated, glide control means for preventing divergent stall during forward glide of the inflated canopy comprising airflow deflecting means mounted on the canopy underlying a relatively imperforate portion thereof for downwardly deflecting airflow relative to the inflated canopy, said airflow deflecting means including a flexible panel having a leading edge secured to the canopy and extending cross-sectionally across said channel and a displaceable control edge downwardly deflectable into said airflow channel.

10 The combination of claim 9, wherein the canopy has a forward nose portion and a trailing edge spaced therefrom by a predetermined distance along a keel line, said trailing edge cross-sectionally defining at least one lobe dimensionally varied transversely of the keel line to regulate forward glide speed.

11. The combination of claim 10 wherein the rear edge of the panel is spaced from the nose portion of the canopy by approximately six-tenths of said predetermined distance along the keel line.

12. In combination with a parachute having a canopy enclosing at least one channel through which airflow is conducted toward a trailing edge during controlled descent, airflow deflecting means extending cross-sectionally across said channel, comprising a flexible panel having a leading edge secured to the canopy forwardly spaced from the trailing edge and a displaceable portion rearwardly spaced from the leading edge, and control means secured to the displaceable portion for downward displacement thereof into said airflow conducting channel enclosed by the canopy when inflated.